(12) United States Patent
Yamasaki et al.

(10) Patent No.: US 7,691,268 B2
(45) Date of Patent: Apr. 6, 2010

(54) WASTE GAS/WASTEWATER TREATMENT EQUIPMENT AND METHOD OF TREATING WASTE GAS/WASTEWATER

(75) Inventors: Kazuyuki Yamasaki, Hiroshima (JP); Keichiro Uda, Kyoto-fu (JP); Kazumi Chuhjoh, Kagawa-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 11/816,867

(22) PCT Filed: Jan. 31, 2006

(86) PCT No.: PCT/JP2006/301552
§ 371 (c)(1),
(2), (4) Date: Aug. 22, 2007

(87) PCT Pub. No.: WO2006/095510
PCT Pub. Date: Sep. 14, 2006

(65) Prior Publication Data
US 2009/0127188 A1 May 21, 2009

(30) Foreign Application Priority Data
Mar. 4, 2005 (JP) ............................. 2005-060621
Dec. 16, 2005 (JP) ............................. 2005-363794

(51) Int. Cl.
*C02F 3/30* (2006.01)
*C02F 1/44* (2006.01)
*C02F 1/74* (2006.01)
*B01D 53/54* (2006.01)
*B01D 65/02* (2006.01)

(52) U.S. Cl. .................. 210/605; 210/620; 210/259; 423/245.2; 95/237

(58) Field of Classification Search .................. 210/605, 210/615, 620, 621, 623, 252, 259; 423/235, 423/245.2; 95/187, 237
See application file for complete search history.

(56) References Cited

U.S. PATENT DOCUMENTS 5,314,644 A   5/1994   Michelsen et al.

(Continued)

FOREIGN PATENT DOCUMENTS

JP         51-124666       10/1976

(Continued)

OTHER PUBLICATIONS

English translation of the International Preliminary Report on Patentability mailed Sep. 20, 2007 in corresponding PCT application PCT/JP2006/301552.

(Continued)

*Primary Examiner*—Fred Prince
(74) *Attorney, Agent, or Firm*—Nixon & Vanderhye P.C.

(57) ABSTRACT

Waste gas/wastewater treatment equipment treats waste gas in a scrubber 18 by using micronanobubble water produced in a micronanobubble reaction vessel 31 as washing water. Waste gas is efficiently cleaned by the substance surface high-velocity cleaning function which micronanobubbles have. The washing water having been used in the waste gas treatment is reused in wastewater treatment in adjustment tank 1, denitrification tank 3 and nitrification tank 11 which constitute a wastewater treatment section. Thus, the micronanobubbles contained in the washing water are utilized in wastewater treatment, so that efficiency of wastewater treatment is enhanced.

12 Claims, 6 Drawing Sheets

U.S. PATENT DOCUMENTS

| | | | |
|---|---|---|---|
| 5,681,470 A * | 10/1997 | Safi | 210/603 |
| 6,209,855 B1 | 4/2001 | Glassford | |
| 6,228,267 B1 * | 5/2001 | Yamasaki et al. | 210/615 |
| 6,479,276 B1 * | 11/2002 | Thom et al. | 435/266 |
| 6,830,690 B2 | 12/2004 | Schmid | |
| 2006/0054205 A1 | 3/2006 | Yabe et al. | |
| 2009/0020474 A1 | 1/2009 | Yamasaki et al. | |
| 2009/0032460 A1 | 2/2009 | Yamasaki et al. | |

FOREIGN PATENT DOCUMENTS

| | | |
|---|---|---|
| JP | 52-129677 | 10/1977 |
| JP | 62-197197 | 8/1987 |
| JP | 04-083594 | 3/1992 |
| JP | 07-195091 | 8/1995 |
| JP | 10-047649 | 2/1998 |
| JP | 10-128377 | 5/1998 |
| JP | 11-047738 | 2/1999 |
| JP | 11-057772 | 3/1999 |
| JP | 11-156148 | 6/1999 |
| JP | 11-333490 | 12/1999 |
| JP | 2000-167555 | 6/2000 |
| JP | 3095620 | 8/2000 |
| JP | 2000-271577 | 10/2000 |
| JP | 2000-279975 | 10/2000 |
| JP | 2000-308900 | 11/2000 |
| JP | 2001-038348 | 2/2001 |
| JP | 2001-198584 | 7/2001 |
| JP | 2002-143885 | 5/2002 |
| JP | 2003-033625 | 2/2003 |
| JP | 2003-071256 | 3/2003 |
| JP | 2003-094086 | 4/2003 |
| JP | 3467671 | 9/2003 |
| JP | 2003-284946 | 10/2003 |
| JP | 2003-334548 | 11/2003 |
| JP | 2004-121962 | 4/2004 |
| JP | 2004-290735 | 10/2004 |

OTHER PUBLICATIONS

U.S. Office Action mailed Jan. 28, 2009 in related U.S. Appl. No. 11/816,880.

English translation of the International Preliminary Report on Patentability mailed Sep. 20, 2007 in PCT application PCT/JP2006/301551.

Kukizaki et al., "Generation of Monodisperse Nanometer Bubbles Through a Porous Membrane and Control of Bubble Sizes," pp. 654-659 (2004).

Takagi et al., "Behavior of Rising Bubbles in Water Containing Surfactant," pp. 16-23 (2003).

International Search Report for PCT/JP2006/301553 mailed May 2, 2006.

English translation of the International Preliminary Report on Patentability mailed Sep. 20, 2007 in PCT application PCT/JP2006/301553.

International Search Report for PCT/JP2006/301552 mailed May 2, 2006.

* cited by examiner

Fig.6A

NITROGEN CONCENTRATION
IN HIGH-CONCENTRATION NITROGEN WASTEWATER : 2000ppm

| TANK NAME | RETAINING PERIOD (DAY) | TIMING (DAY) 0.5 | 1 | 1.5 | 2 | 2.5 | 3 | 3.5 | 4 |
|---|---|---|---|---|---|---|---|---|---|
| ADJUSTMENT TANK | 0.5 | — | | | | | | | |
| DENITRIFICATION TANK | 1 | | — | — | | | | | |
| NITRIFICATION TANK | 2 | | | | — | — | — | — | |
| MICRONANOBUBBLE REACTION VESSEL | 0.2 | | | | | | | — | |
| SCRUBBER | 0.01 | | | | | | | | · |

Fig.6B

NITROGEN CONCENTRATION
IN HIGH-CONCENTRATION NITROGEN WASTEWATER : 4000ppm

| TANK NAME | RETAINING PERIOD (DAY) | TIMING (DAY) 1 | 2 | 3 | 4 | 5 | 6 | 7 | 8 |
|---|---|---|---|---|---|---|---|---|---|
| ADJUSTMENT TANK | 0.5 | — | | | | | | | |
| DENITRIFICATION TANK | 2 | | — | — | | | | | |
| NITRIFICATION TANK | 4 | | | | — | — | — | — | |
| MICRONANOBUBBLE REACTION VESSEL | 0.2 | | | | | | | — | |
| SCRUBBER | 0.01 | | | | | | | | · |

US 7,691,268 B2

WASTE GAS/WASTEWATER TREATMENT EQUIPMENT AND METHOD OF TREATING WASTE GAS/WASTEWATER

This application is the U.S. national phase of International Application No. PCT/JP2006/301552, filed Jan. 31, 2006, which designated the U.S. and claims priority to Japanese Patent Application Nos. 2005-060621, filed Mar. 4, 2005, and 2005-363794, filed Dec. 16, 2005, the entire contents of each of which are hereby incorporated by reference.

TECHNICAL FIELD

The present invention relates to waste gas/wastewater treatment equipment and a method of treating waste gas/wastewater. Specifically, the present invention relates to waste gas/wastewater treatment equipment and a method of treating waste gas/wastewater, for example, which can effectively treat high-concentration nitrogen wastewater (such as wastewater containing high-concentration ammonium) and wastewater containing aminoethanol discharged mainly from semiconductor plants for the purposes of compliance with the total volume control of nitrogen in conformity to partial amendments to Water Pollution Control Law implemented as of April 2004 and compliance with the emission reduction of toxic substances in conformity to PRTR (Pollutant Release and Transfer Register) Law implemented as of April 2001, and which can achieve energy saving and reduction in initial costs, running costs and maintenance costs.

BACKGROUND ART

High-concentration nitrogen wastewater such as wastewater containing high-concentration, ammonium at about 3,000 ppm has high organism toxicity. As the result, it has been conventionally impossible in general to apply microbial treatment thereto. Therefore, in the case where the microbial treatment has generally been applied to wastewater containing nitrogen, ammonium concentration is as low as several hundred ppm.

Accordingly, the wastewater containing high-concentration ammonium of 3,000 ppm or more has been concentrated to about 1/10 with use of an evaporator as a physical treatment method, and then resultant concentrated solutions have been disposed as industrial wastes. The concentrated solutions were deemed as industrial wastes when employing the above-stated method of concentrating the wastewater with use of the evaporator and discharging them as industrial wastes from plants. Thus, this method has caused such problems as increase in industrial wastes from business establishments and air pollution due to the use of fuel such as heavy oil because the concentrated solutions as industrial wastes have generally been disposed by incineration.

The treatment method using the evaporator consumes a large quantity of energy and involves large plant equipment, which has caused a problem of large initial costs, running costs and maintenance costs.

As another prior art, a biological treatment method has been disclosed in Patent Document 1 (JP 2,000-308900 A). According to the biological treatment method in this prior art, degradation of treatment efficiency caused by nitrite-nitrogen is prevented to achieve stable treatment, wherein the nitrite-nitrogen is generated during treatment of wastewater containing high-concentration ammonium-nitrogen. Specifically, the biological treatment method includes a biological denitrification process using autotrophic bacteria resistant to nitrite-nitrogen, so that the nitrite-nitrogen is reduced to nitrogen gas before being removed from the wastewater.

As to the method of treating wastewater containing ammonium, there has been disclosed a nitrification tank, a denitrification tank and a UV oxidation tank, as well as treatments in the nitrification tank, a photocatalytic UV oxidation tank, the denitrification tank and the UV oxidation tank.

Another biological treatment method, as a prior art, is disclosed in Patent Document 2 (JP 3467671B).

This biological treatment method is classified to the nitrification and denitrification method. In the nitrification and denitrification method, organic wastewater within a raw water tank is sequentially fed to a denitrification tank and a nitrification tank by using a feeding pump, and the wastewater is circulated between both the tanks. As the result, ammonia-state nitrogen contained in the organic wastewater is reduced to nitrogen gas by biological nitrification and denitrification actions. Further, sludge and treated water are separated with use of a suction pump by a filtration film unit sunk in wastewater inside the nitrification tank.

The nitrification and denitrification method is characterized in that a pipe is branched on the way from the denitrification tank to the nitrification tank so that an end of the diverged pipe may be opened in the denitrification tank. As the result, part of organic wastewater fed from the denitrification tank to the nitrification tank is ejected into the organic wastewater in the denitrification tank. In other words, according to this nitrification and denitrification method, wastewater is fed to both the denitrification tank and the nitrification tank by using the feeding pump, and is circulated between both the tanks.

As yet another prior art, another biological treatment method is disclosed in Patent Document 3 (JP 3095620B).

In this biological treatment method, treatment is performed by a biological nitrogen rejection apparatus composed of a denitrification tank for receiving inflow of raw water containing organic matter, a nitrification tank for receiving inflow of denitrification tank mixtures from the denitrification tank, a nitrified liquid circulation channel for circulating a nitrified liquid of the nitrification tank to the denitrification tank, and a nitrification tank air diffuser placed inside the nitrification tank.

More specifically, the biological nitrogen rejection apparatus has a denitrifying bacteria immobilization support charging zone in the denitrification tank so as to catch and remove the suspended solids in the raw water flowing into the denitrification tank. Moreover, a raw water induction channel and a nitrified liquid circulation channel are linked to a lower position of the denitrifying bacteria immobilization support charging zone in the denitrification tank. A sludge hopper section is provided on the bottom section of the denitrification tank so as to accumulate the suspended solids caught and removed in the denitrifying bacteria immobilization support charging zone. A hopper air diffuser is provided in the sludge hopper section.

However, as described above, wastewater containing high-concentration ammonium at about 3,000 ppm has high organism toxicity, and therefore microbial treatment has not generally been applied. Specifically, the high-concentration ammonium wastewater has been treated by an incineration method or a concentration method because the high-concentration ammonium wastewater is too high in organism toxicity to undergo microbial treatment. Accordingly, the concentration method has such problems as heavy consumption of energy and increase in industrial wastes caused by concentrated solutions.

As yet another prior art, method and device for treatment using nanobubbles are disclosed in Patent Document 4 (JP 2004-121962 A).

This prior art utilizes such characteristics of nanobubbles as decrease in buoyancy, increase in surface area, increase in surface activity, generation of local high pressure fields, a surface active property and an antiseptic property which are attained by achievement of electrostatic polarization. Specifically, this prior art has disclosed that associating these characteristics with each other makes it possible to exert a fouling component adsorption function, a substance surface high-velocity cleaning function and an antiseptic function, so that advanced cleaning of various substances is conducted with low environmental load to purify the contaminated water.

As yet another prior art, a nanobubble generation method has been disclosed in Patent Document 5 (JP 2003-334548 A).

In this prior art, it has been disclosed that there is either step (1) for gasifying part of liquid by decomposition in liquids, step (2) for applying ultrasonic waves in liquids, or step (3) composed of a step for gasifying part of liquid by decomposition and a step for applying ultrasonic waves.

Although these two prior arts have certainly disclosed purification of contaminated water by using nanobubbles or removal of dirt on the surface of solids by using nanobubbles, they fail to disclose a technology to enhance efficiency of treatment and quality of treatment water at the time of treating waste gas and wastewater.

DISCLOSURE OF INVENTION

Subjects Solved by the Invention

It is an object of the present invention to provide a method of treating waste gas/wastewater and waste gas/wastewater treatment equipment allowing increase in treatment efficiency and reduction in treatment cost.

Means for Solving the Subjects

To achieve the above-mentioned object, the present invention provides a method of treating waste gas/wastewater, comprising the steps of:

using micronanobubble water containing micronanobubbles as washing water for treating waste gas, and reusing the washing water used for treating the waste gas for treatment of wastewater.

According to the method of treating waste gas/wastewater in the present invention, micronanobubble water is used as washing water for treatment of waste gas. Therefore, the substance surface high-velocity cleaning function which micronanobubbles have makes it possible to efficiently clean waste gas. The washing water having been used in the waste gas treatment is reused in wastewater treatment. Therefore, the micronanobubbles contained in the washing water are utilized in wastewater treatment, so that efficiency of wastewater treatment is enhanced. More specifically, the micronanobubbles have (1) surface active property and antiseptic property, (2) fouling component adsorption function, (3) substance surface high-velocity cleaning function, (4) antiseptic function, (5) catalytic action and function, and (6) action and function to enhance microbial activity.

Therefore, according to the method of treating waste gas/wastewater in the present invention, it becomes possible to enhance treatment efficiency of waste gas and wastewater and to reduce treatment costs.

Description is now given of three kinds of babble.
(i) normal bubbles rise in water to end up bursting on the surface and disappear.
(ii) micro bubbles, which are fine bubbles with a diameter of 50 microns (μm) or less, shrink in water and end up disappearing (completely dissolving).
(iii) nano bubbles, which are smaller than micro bubbles and have a diameter of several hundred nm or less (e.g., diameter of 100 to 200 nm), are said to be able to keep on existing in water on a permanent basis.

Thus, the micronanobubbles herein refer to the mixture of the microbubbles and nanobubbles.

The present invention also provides waste gas/wastewater treatment equipment, comprising:

a micronanobubble water production section for producing micronanobubble water containing micronanobubbles;

a waste gas treatment section for treating waste gas with use of the micronanobubble water produced by the micronanobubble water production section as washing water; and a wastewater treatment section for receiving the washing water used for treatment of the waste gas.

According to the waste gas/wastewater treatment equipment of the present invention, the micronanobubble water produced in the micronanobubble water production section is used as washing water for treatment of waste gas. Therefore, the substance surface high-velocity cleaning function which micronanobubbles have makes it possible to efficiently clean waste gas. The washing water having been used in the waste gas treatment is used for wastewater treatment. Thereby, the micronanobubbles contained in the washing water are utilized in wastewater treatment, so that efficiency of wastewater treatment is enhanced.

According to the waste gas/wastewater treatment equipment of the present invention, it becomes possible to enhance treatment efficiency of waste gas and wastewater and to reduce treatment costs. Further, producing the micronanobubble water, as raw water, with use of treatment water, which is obtained through treatment of wastewater in the wastewater treatment section, allows reduction in running cost regarding waste gas treatment.

In one embodiment of the present invention, the wastewater treatment section has a submerged membrane, and the micronanobubble water production section produces the micronanobubble water with use of treatment water obtained from the submerged membrane in the wastewater treatment section as raw water.

According to the waste gas/wastewater treatment equipment in the present embodiment, the micronanobubble water production section produces the micronanobubble water with use of treatment water obtained from the submerged membrane in the wastewater treatment section, as raw water. Micronanobubbles are efficiently produced because the treatment water contains a lot of electrolyte.

In one embodiment of the present invention, the wastewater treatment section has an adjustment tank, a denitrification tank, and a nitrification tank including a submerged membrane, the micronanobubble water production section is a micronanobubble reaction vessel including a micronanobubble generator, and the waste gas treatment section is a water scrubber.

According to the waste gas/wastewater treatment equipment in the present embodiment, the waste gas treatment section has a water scrubber. Accordingly, a waste gas treatment system can be established with relative ease. Also, in the present embodiment, the micronanobubble reaction vessel produces micronanobubble water with use of treatment water, as raw water, obtained from the submerged membrane in the nitrification tank included in the wastewater treatment section. The micronanobubble water from the micronanobubble reaction vessel are used as washing water for the water scrubber. Therefore, treatment water deriving from wastewater introduced into the wastewater treatment section can effectively be recycled as washing water for the water scrubber serving as a waste gas treatment section.

In one embodiment of the present invention, nitrogen wastewater is introduced into the adjustment tank in the wastewater treatment section, and a wastewater introduction section is provided for introducing the washing water, as wastewater, used for treatment of waste gas in the waste gas treatment section into the adjustment tank in the wastewater treatment section.

According to the waste gas/wastewater treatment equipment in the present embodiment, the adjustment tank in the wastewater treatment section can carry out pretreatment of high-concentration nitrogen wastewater with the micronanobubbles contained in wastewater coming from the waste gas treatment section. The micronanobubbles can be circulated and used in the wastewater treatment section.

Specifically, micronanobubbles has a character that they are maintained for a long time in water. The wastewater introduced from the waste gas treatment section into the adjustment tank becomes wastewater containing micronanobubbles. By mixing high-concentration nitrogen wastewater and wastewater containing micronanobubbles in the adjustment tank, it becomes possible to carry out oxidation pretreatment with use of micronanobubbles. The pretreatment in the adjustment tank allows downsizing of the entire equipment, particularly the nitrification tank, which leads to reduction in initial cost. In the present embodiment, it becomes possible to apply micronanobubble treatment (e.g., partial oxidation of ammonia nitrogen up to nitrite nitrogen) to wastewater in the adjustment tank before applying microbial treatment in the denitrification tank and the nitrification rank.

In one embodiment of the present invention, the waste gas treatment section treats waste gas containing nitrogen compounds.

According to the waste gas/wastewater treatment equipment in the present embodiment, the high-velocity cleaning function of the micronanobubbles enables nitrogen contained in waste gas to efficiently shift to washing water.

In one embodiment of the present invention, the waste gas is waste gas containing aminoethanol.

According to the waste gas/wastewater treatment equipment in the present embodiment, in the waste gas treatment section, the washing water containing micronanobubbles can effectively shift aminoethanol contained in waste gas from the waste gas side to the washing water side, based on the gas-liquid contact principle. Thereby, waste gas treatment is achieved.

In one embodiment of the present invention, the waste gas treatment section comprises:

an upper section for spraying micronanobubble water from the micronanobubble water production section as washing water;

a lower section for storing the sprayed washing water; and a circulation section for circulating the washing water from the lower section to the upper section.

According to the waste gas/wastewater treatment equipment in the present embodiment, waste gas is cleaned in the waste gas treatment section by using two kinds of water containing micronanobubbles: washing water and circulating water, that is, circulated washing water. Thereby, the capability of waste gas treatment can be enhanced.

In one embodiment of the present invention, the nitrification tank has a micronanobubble generator for generating micronanobubbles for cleaning the submerged membrane.

According to the waste gas/wastewater treatment equipment in the present embodiment, the submerged membrane in the nitrification tank is cleaned with use of micronanobubbles generated by the micronanobubble generator. Therefore, cleaning of the submerged membrane can be ensured and the quantity of treatment water in the submerged membrane can be increased.

In one embodiment, of the present invention, the nitrification tank has an air diffusing pipe for discharging air for cleaning the submerged membrane.

According to the waste gas/wastewater treatment equipment in the present embodiment, the submerged membrane in the nitrification tank is washed with use of both the air discharged from the air diffusing pipe and the micronanobubbles generated by the micronanobubble generator. Therefore, the combination of two kinds of bubbles allows more efficient washing of the submerged membrane.

In one embodiment of the present invention, the waste gas is waste gas containing volatile organic compounds.

According to the method of treating waste gas/wastewater in the present embodiment, the washing water is micronanobubble water, which ensures cleaning of volatile organic compounds such as acetone contained in waste gas.

In one embodiment of the present invention, the waste gas is waste gas containing volatile organic compounds.

According to the waste gas/wastewater treatment equipment in the present embodiment, the washing water is micronanobubble water, which ensures cleaning of volatile organic compounds such as acetone contained in waste gas.

EFFECT OF THE INVENTION

According to the method of treating waste gas/wastewater in the present invention, the micronanobubble water is used as washing water for treatment of waste gas. Therefore, the substance surface high-velocity cleaning function which micronanobubbles have makes it possible to efficiently clean waste gas. Also, by using the washing water having been used in the waste gas treatment for wastewater treatment, the micronanobubbles contained in the washing water are utilized in wastewater treatment, so that efficiency of wastewater treatment is enhanced. Thus, according to the method of treating waste gas/wastewater of the present invention, it is possible to enhance efficiency in treatment of waste gas and wastewater, and consequently to achieve cost reduction in treatment thereof.

BRIEF DESCRIPTION OF DRAWINGS

FIG. 6A shows an example of a timing chart in the case where the nitrogen concentration of nitrogen wastewater is 2,000 ppm in the first to fifth embodiments; and FIG. 6B shows an example of a timing chart in the case where the nitrogen concentration of nitrogen wastewater is 4,000 ppm in the first to fifth embodiments.

Figure 1:
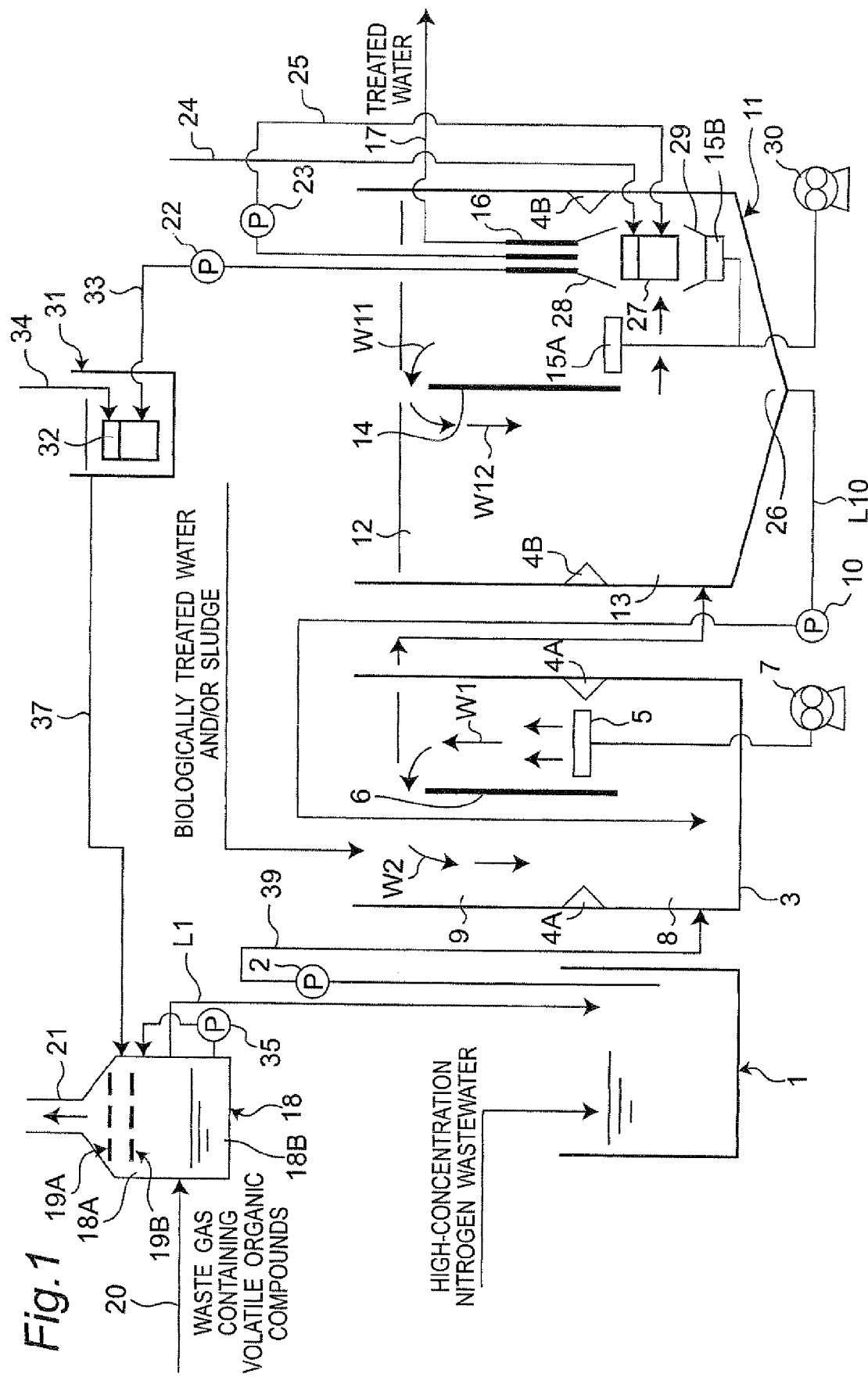
FIG. 1 shows a schematic view of an effluent treatment device in a first embodiment of the present invention.

DESCRIPTION OF SYMBOLS 1 adjustment tank
2 adjustment tank pump
3, 3N denitrification tank
4 separation wall
5 air diffusing pipe
6 divider plate
7 denitrification tank blower
8 lower section
9 upper section
10 return sludge pump
11, 11N nitrification tank
12 aerobic section
13 semi-anaerobic section
14 divider plate
15 air diffusing pipe
16 submerged membrane
17 gravity pipe
18 scrubber
19A upper water spray pipe
19B lower water spray pipe
20 waste gas inlet
21 treated gas outlet
22 water pump
23 water pump
24 air suction pipe
25 water pipe
26 lower hopper section
27 micro nano bubble generator
28 submerged membrane cover
29 air diffusing pipe cover
30 nitrification tank blower
31 micronanobubble reaction vessel
32 micro nano bubble generator
33 water pipe
34 air suction pipe
35 circulation pump
36A, 36B polyvinylidene chloride fillings
37 pipe

BEST MODE FOR CARRYING OUT THE INVENTION

Hereinbelow, the present invention will be described in detail in conjunction with the embodiments with reference to the drawings.

First Embodiment

FIG. 1 shows a schematic view of waste gas/wastewater treatment equipment in a first embodiment of the present invention. The equipment in the first embodiment is composed of an adjustment tank 1, a denitrification tank 3, a nitrification tank 11 having a submerged membrane 16, a micronanobubble reaction vessel 31 as a micronanobubble water production section, and a scrubber 18 as a waste gas treatment section.

The adjustment tank 1 receives not only high-concentration nitrogen wastewater but also wastewater containing aminoethanol. The wastewater containing aminoethanol, which is a volatile organic compound, is introduced into the adjustment tank 1 via a pipe L1 in the form of overflow from the scrubber 18 that is a wastewater introduction section. The quantity and quality of wastewater introduced into the adjustment tank 1 are adjusted therein. The high-concentration nitrogen wastewater introduced into the adjustment tank 1 includes high-concentration nitrogen wastewater from semiconductor plants, for example. Specifically, the high-concentration nitrogen wastewater includes wastewater containing high-concentration ammonium generated in the CMP (Chemical/Mechanical Polishing) process performed in semiconductor plants.

Wastewater containing aminoethanol is introduced into the adjustment tank 1 from the scrubber 18 serving as the waste gas treatment section. This makes it possible to use the aminoethanol as a hydrogen donor in the denitrification tank 3 which is placed subsequent to the adjustment tank 1. Consequently, the cost of chemicals can be saved, compared with the case of using methanol as a hydrogen donor in the denitrification tank 3. Also, micronanobubbles exist in the wastewater containing aminoethanol, as described later. Therefore, the micronanobubbles partially oxidize ammonium contained in the wastewater containing high-concentration ammonium, which is high-concentration nitrogen wastewater. Treatment water from the adjustment tank 1 is introduced into a lower section 8 of the denitrification tank 3 via a pipe 39 by an adjustment tank pump 2.

Biologically treated water and/or sludge generated after biological treatment is introduced into the upper section 9 of the denitrification tank 3. The biologically treated water and/or the sludge generated after the biological treatment contains microelements such as phosphorus, potassium, calcium and magnesium. The microelements make it possible to promote the activity of all the microorganisms in the denitrification tank 3 and the nitrification tank 11. In the nitrification tank 11 in particular, high-concentration microbial treatment is applied to treated water with use of the submerged membrane 16 set therein. Therefore, the treated water containing the microelements can increase the activity of microorganisms so as to stabilize and reinforce the treatment by these microorganisms. The micronanobubbles also increase the activity of microorganisms.

The lower section 8 of the denitrification tank 3 is higher in microbial concentration than the upper section 9 due to gravity. The treatment water from the adjustment tank 1 is introduced into the lower section 6 of the denitrification tank 3 by the adjustment tank pump 2. Thereby, it becomes possible to suppress excessive stimulation given by the treatment water to the microorganisms in the denitrification tank 3. This stabilizes and reinforces the microbial treatment.

In the denitrification tank 3, a separation wall 4A is mounted on its inner wall to define a boundary between the upper section 9 and the lower section 8. In the denitrification tank 3, a divider plate 6 is also placed to vertically extend in a lateral central section inside the tank. An air diffusing pipe 5 is placed between the divider plate 6 and the separation wall 4A. The air diffusing pipe 5 is connected to a denitrification tank blower 7. In the denitrification tank 3, an air lift effect is attained by combination of the air diffusing pipe 5 and the divider plate 6. Specifically, air bubbles are discharged from the air diffusing pipe 5 and a water stream generates along the divider plate 6. More specifically, in the denitrification tank 3 as shown in FIG. 1, ascending stream W1 is generated in an area on the right side of the divider plate 6 where the air diffusing pipe 5 is placed; whereas descending stream W2 is generated in an area on the left side of the divider plate 6.

Thus, agitation is performed in the denitrification tank 3 even if MLSS (Mixed Liquor Suspended Solid) concentration of treated water is 15,000 ppm or more. In other words, the divider plate 6 and the air diffusing pipe 5 are placed in the denitrification tank 3 so as to prevent generation of so-called dead space, which is an area out of agitation reach. As the result, the entire area in the denitrification tank 3 is agitated by the air lift method.

The denitrification tank blower 7 basically employs intermittent operation which is desirably set by a timer or the like.

The separation wall 4A is placed on the lateral wall of the denitrification tank 3. Therefore, in comparison between the upper section 9 of the denitrification tank 3 and the lower section 8 of the denitrification tank 3, agitation by the air lift effect takes place more smoothly in the upper section 9 of the denitrification tank 3. Some degree of agitation is necessary in the lower section 8 of the denitrification tank 3. Agitation in the lower section 8 should be less frequent than that in the upper section 9 of the denitrification tank 3 since microorganisms are concentrated in high levels by natural settling in the lower section 8 of the denitrification tank 3.

High-concentration return sludge containing microorganisms is introduced in large amounts into the lower section 8 of the denitrification tank 3 from a lower hopper section 26 of a semi-anaerobic section 13 included in the nitrification tank 11 via a return pipe L10 connected to the lower hopper section 26 and via a return sludge pump 10. A return section is composed of the return pipe L10 and the return sludge pump 10. By the return section, semi-anaerobic sludge in the semi-anaerobic section 13 on the lower side of the nitrification tank 11 can be moved to the lower section 8 of the denitrification tank 3 without being exposed to oxygen in the air.

The high-concentration nitrogen wastewater introduced into the denitrification tank 3 is anaerobically treated in the lower section 6 with aminoethanol in the aminoethanol-containing wastewater as a hydrogen donor. Then, the wastewater flows to the upper section 9 of the denitrification tank 3 before being introduced into the semi-anaerobic section 13 on the lower side of the nitrification tank 11 by natural fail from the upper section 9.

The nitrification tank 11 has an upper aerobic section 12 and the lower semi-anaerobic section 13. The nitrification tank 11 also has a separation wall 4B mounted on the inner wall of the tank. The separation wall 4B bounds the aerobic section 12 and the semi-anaerobic section 13. The submerged membrane 16 is placed in the aerobic section 12. The nitrification tank 11 also has a divider plate 14 extending in vertical direction in a lateral central section inside the tank. The divider plate 14 is present over an almost upper half of the tank in vertical direction. In FIG. 1, the submerged membrane 16 is placed in an area on the right side of the divider plate 14. The submerged membrane 16 is connected to a gravity pipe 17 for deriving treated water. An air diffusing pipe 15A is placed between the submerged membrane 16 and the divider plate 14, and is connected to a nitrification tank blower 30. The air lift effect is generated by combination of the air diffusing pipe 15A and the divider plate 14. Air discharged from, the air diffusing pipe 15A generates a water stream along the divider plate 14. Specifically, in the nitrification tank 11 shown in FIG. 1, ascending stream W11 is generated in an area on the right side of the divider plate 6, whereas descending stream W12 is generated in an area on the left side of the divider plate 6. Therefore, in the nitrification tank 11, agitation can still be performed in the tank even if MLSS concentration of treated water is 15,000 ppm or more.

The submerged membrane 16 is placed in the nitrification tank 11. Microorganisms in the treatment water are either left in the nitrification tank 11 or returned to the lower section 8 of the denitrification tank 3 by the aforementioned return sludge pump 10. The return sludge is transferred to the lower section 8 of the denitrification tank 3 by the return sludge pump 10 which is a normal pump. Thus, a large amount of return sludge can be transferred without being exposed to the air, so that anaerobic state of the return sludge can reliably be maintained.

From the submerged membrane 16, treated water is sent out through the gravity pipe 17, while the treated water is also conveyed to the micro nano bubble generator 32 in the micro nano bubble reaction tank 31 via a water pump 22 and a water pipe 33. Further, the submerged membrane 16 is connected to a water pump 23 and a water pipe 25. The water pump 23 and the water pipe 25 are connected to a micro nano bubble generator 27 placed below the submerged membrane 16. Therefore, the treated water from the submerged membrane 16 is introduced into the micro nano bubble generator 27 via the water pump 23 and the water pipe 25. An air suction pipe 24 is connected to the micro nano bubble generator 27 for feeding air therefrom.

In the meanwhile, the microbial sludge is returned from the lower hopper section 26 of the semi-anaerobic section 13 to the lower section 8 of the denitrification tank 3 by the return sludge pump 10, and returns again to the semi-anaerobic section 13 in the nitrification tank 11 through the upper section 9 of the denitrification tank 3. Thus, circulation of the microbial sludge is established. By circulating the microbial sludge between both the tanks, the microbial concentration in both the tanks is maintained at almost the same level. When the microbial concentration is as high as 10,000 ppm or more in MLSS (Mixed Liquor Suspended Solid) concentration, dead space is generated where agitation becomes impossible by using general agitators, underwater agitators and circulation pumps. In the present embodiment, the combination of the divider plate 14 and the air diffusing pipe 15A generates a water stream along the divider plate 14, so that the entire region in the tank is agitated by the so-called air lift method. That is to say, it is prevented to generate the dead space which is out of agitation reach.

The separation wall 4B is also placed on the lateral wall of the nitrification tank 11. Therefore, in comparison between the aerobic section 12 and the semi-anaerobic section 13, agitation takes place more smoothly in the aerobic section 12. Some degree of agitation is necessary in the semi-anaerobic section 13. Agitation in the semi-anaerobic section 13 should be less frequent than that in the aerobic section 12 since microorganisms are concentrated in high levels by natural settling in the semi-anaerobic section 13. The microbial concentration in both the denitrification tank 3 and the nitrification tank 11 should be maintained at 10,000 ppm or more in MLSS (Mixed Liquor Suspended Solid).

On the submerged membrane 16, a submerged membrane cover 28 is mounted as a guide. With the presence of the submerged membrane cover 28, micronanobubbles generated by the micronanobubble generator 27 ascend in a cluster, which allows more efficient cleaning of the submerged membrane 16. An air diffusing pipe 15B is also placed below the micronanobubble generator 27. The air diffusing pipe 15B is connected to the nitrification tank blower 30. On the air diffusing pipe 15B, an air diffusing pipe cover 29 is mounted as a guide. The air diffusing pipe cover 29 allows the air to efficiently hit the submerged membrane 16 via the micronanobubble generator 27 placed above, wherein the air is fed from the nitrification tank blower 30 and discharged from the air diffusing pipe 15B. This further increases the cleaning effect of the submerged membrane 16.

Operation of the micronanobubble generator 27 and operation of the nitrification tank blower 30 for cleaning the submerged membrane 16 may be performed separately and independently or they may be performed concurrently. When both the generator and the blower are operated concurrently, the cleaning effect is further increased by both the air bubbles from the air diffusing pipe 15B and the micronanobubbles generated by the micronanobubble generator 27. It may be determined which operation should be selected after observing the state of the submerged membrane 16.

Getting back to the description of the denitrification tank 3, it provided with an oxidation-reduction potentiometer (unshown) for measurement of the degree of anaerobiotic. In the denitrification tank 3, nitrate-nitrogen is reduced up to nitrogen gas by anaerobic microorganisms under the presence of aminoethanol that is a hydrogen donor, wherein the nitrate-nitrogen is contained in the treatment water introduced from the semi-anaerobic section 13 into the nitrification tank 11 by the return sludge pump 10. The above-stated nitrate-nitrogen contained in the treatment water is the one which is obtained as the result that high-concentration ammonium wastewater or aminoethanol, as high-concentration nitrogen wastewater, has been dissolved to change to nitrate-nitrogen by microorganisms in the aerobic section 12 of the nitrification tank 11.

In the denitrification tank 3, organic matter other than aminoethanol is biologically dissolved by anaerobic microorganisms. Next, the treatment water flowing from the upper section 9 in the denitrification tank 3 is introduced into the semi-anaerobic section 13 on the lower side of the nitrification tank 11, as described above. It is herein defined that the anaerobic section is in the state that no dissolved oxygen is present, the aerobic section is in the state that a dissolved oxygen level is maintained at several ppm, and the semi-anaerobic section is in the state that the dissolved oxygen level is 0 ppm or around 0.5 ppm if any dissolved oxygen is present.

In the aerobic section 12 on the upper side of the nitrification tank 11, the water stream is generated by air discharged from the air diffusing pipe 15A. The water stream has an influence on the lower semi-anaerobic section 13 to some degree. However, the influence on the semi-anaerobic section 13 can be made less than that on the aerobic section 12 by the presence of the separation wall 4B placed in the nitrification tank 11. High microbial concentration in the nitrification tank 11 can minimize the influence of the water stream in the aerobic section 12 on the semi-anaerobic section 13 even though the separation wall 4B has a size as shown in FIG. 1.

In the present embodiment, the circulation system is provided with the return sludge pump 10 and the return sludge pipe L10 which are located between the denitrification tank 3 and the nitrification tank 11. In the circulation system, the semi-anaerobic section 13 is placed on the lower side of the nitrification tank 11. Anaerobic microorganisms is moved into the nitrification tank 11 together with the treatment water which is treated by anaerobic microorganisms in the denitrification tank 3. The anaerobic microorganisms are not directly introduced into the aerobic section 12 but into the aerobic section 12 via the semi-anaerobic section 13. This decreases environmental stress on the anaerobic microorganisms moving to the nitrification tank 11. Less environmental stress on the anaerobic microorganisms increases the treatment efficiency in treating nitrogen.

Also, microorganisms peculiar to the semi-anaerobic section 13 proliferate in the nitrification tank 11. Therefore, wastewater is treated not only by anaerobic microorganisms and aerobic microorganisms but also by various microorganisms proliferating in the semi-anaerobic section 13. This makes it possible to comprehensively enhance the microbial treatment efficiency. Installation of the semi-anaerobic section 13 has revealed that the microorganisms proliferating in the semi-anaerobic section 13 contribute to reduction of sludge. The semi-anaerobic section 13 is not equipped with an air diffusing pipe as aerating equipment, so that the semi-anaerobic section 13 is not aerated. However, the semi-anaerobic section 13 is affected to some degree by the water stream in the aerated aerobic section 12 on the upper side of the nitrification tank 11. As the result, the dissolved oxygen level of the semi-anaerobic section 13 becomes 0 ppm or around 0.5 ppm even if any dissolved oxygen is present, which is the necessary condition of the semi-anaerobic section. Thus, the semi-anaerobic state is kept in the semi-anaerobic section 13.

The semi-anaerobic section 13 is provided with the air diffusing pipe 15B and the micronanobubble generator 27 for cleaning the submerged membrane 16. The semi-anaerobic state should be kept by adjusting the quantity of micronanobubbles from the micronanobubble generator 27 and/or the quantity of air discharged from the air diffusing pipe 15B. By these adjustments, it becomes possible to achieve the semi-anaerobic state in which a dissolved oxygen concentration is rather high. For the submerged membrane 16, two types of the submerged membrane, i.e. a flat membrane type and a hollow-fiber membrane type, are available in the market. Either type may be adopted. The treatment water passing through the submerged membrane 16 naturally flows out from the gravity pipe 17 connected to the submerged membrane 16 by gravity. The gravity pipe 17 is of a type which makes the treatment water flow out by water head difference. Therefore, it needs no electricity, which allows energy saving operation. In the case where quantity of the filtrated water by the submerged membrane 16 is decreased, i.e. in the case where quantity of the treatment water is decreased, the submerged membrane 16 is cleaned with sodium hypochlorite or the like.

In the first embodiment, micronanobubbles are generated in the nitrification tank 11. This allows considerable increase in dissolution efficiency of oxygen in the nitrification tank 11 and considerable reduction in operating time of the nitrification tank blower 30. Thereby, energy saving can be achieved. The effect of micronanobubbles makes it possible to keep dissolved oxygen within the aerobic section 12 provided on the upper side of the nitrification tank 11 even when the blower 30 for the nitrification tank 11 is intermittently operated.

As described above, the treatment water filtered by the submerged membrane 16 is introduced into the micronanobubble reaction vessel 31 through the water pump 22 and the water pipe 33 which are placed above the nitrification tank 11 The micronanobubble reaction vessel 31 is provided with the micronanobubble generator 32 therein. An air suction pipe 34 and a water pipe 33 for conveying treatment water from the submerged membrane 16 are connected to the micronanobubble generator 32. The micronanobubble generator 32 is supplied with the air from the air suction pipe 34 as well as the treatment water from the water pipe 33. The micronanobubble generator 32 generates micronanobubbles by using the air and the treatment water.

Any micronanobubble generator available in the market, regardless of manufacturers, can be used for the micronanobubble generator 32. For example, a micronanobubble generator made by Nanoplanet Research Institute Corporation can be adopted as the micronanobubble generator 32. As another product, it is also acceptable to select a microbubble water generator made by SEIKA CORPORATION and convert it to the micronanobubble generator 32 to generate microbubbles.

In the micronanobubble reaction vessel 31, the micronanobubbles generated in the micronanobubble generator 32 are added to the treatment water introduced from the submerged membrane 16 so as to generate micronanobubble water. The micronanobubble water containing micronanobubbles is moved through a pipe 37 in order to be sprayed from an upper water spray pipe 19A of the scrubber 18 as scrubber washing water.

In the scrubber 18 serving as waste gas treatment section, the waste gas containing aminoethanol used in manufacturing equipment is introduced by an exhaust fan (unshown) into a lower section 18B of the scrubber 18 through a waste gas inlet 20. The scrubber washing water contains micronanobubbles. Therefore, the aminoethanol in the waste gas, which has been introduced from the waste gas inlet 20 into the lower section 18B, is effectively shifted to the washing water side. The scrubber 18 is equipped with two spray pipes 19A, 19B in an area of a vertical upper section 18A. The upper spray pipe 19A is positioned above the lower spray pipe 19B. As described before, the upper spray pipe 19A is connected to the pipe 37 into which scrubber washing water is introduced from the micronanobubble reaction vessel 31. As for the lower spray pipe 19B, the washing water, which is stored in the lower area in the scrubber 18, is pumped up by a circulation pump 35 as a circulation section and is sprayed as circulating water from the lower spray pipe 19B. In the scrubber 18, waste gas is cleaned with two kinds of water containing micronanobubbles: washing water from the upper spray pipe 19A; and circulating water from the lower spray pipe 19B. The cleaned gas is then discharged from a treated gas outlet 21 in an uppermost section, so that the capability of waste gas treatment can be enhanced.

The washing water containing micronanobubbles stored in the lower section 18B of the scrubber 18 and the circulating water containing micronanobubbles, as wastewater containing aminoethanol, are introduced into the adjustment tank 1.

In the above embodiment, description has been given of the case as a specific example where waste gas containing volatile organic compounds is the waste gas containing aminoethanol used in manufacturing equipment. However, the waste gas containing volatile organic compounds include waste gas containing isopropyl alcohol, waste gas containing acetone and waste gas containing butyl acetate in addition to the waste gas containing aminoethanol.

Second Embodiment

Figure 2:
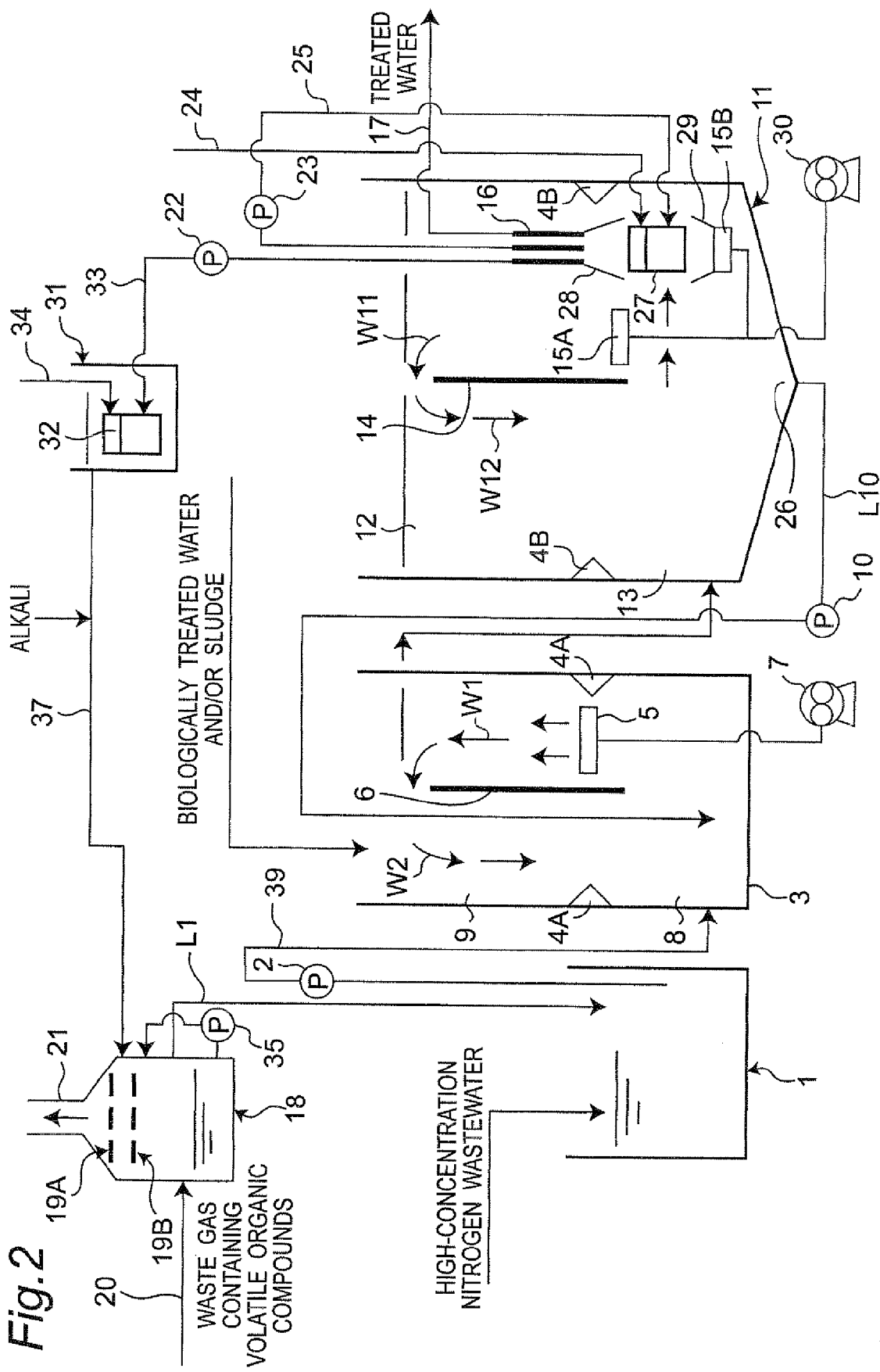
FIG. 2 shows a schematic view of an effluent treatment device in a second embodiment of the present invention.

Next, FIG. 2 shows waste gas/wastewater treatment, equipment in a second embodiment of the present invention. The second embodiment is different from the aforementioned first embodiment only in the point that alkali is added to the micronanobubble water flowing through the pipe 37 between the micronanobubble reaction vessel 31 and the scrubber 18.

In the second embodiment, alkali is added to the micronanobubble water serving as scrubber washing water in the scrubber 18, so that the waste gas treatment capability in the scrubber 18 can be enhanced. Examples of the alkali to be added include caustic soda.

Third Embodiment

Figure 3:
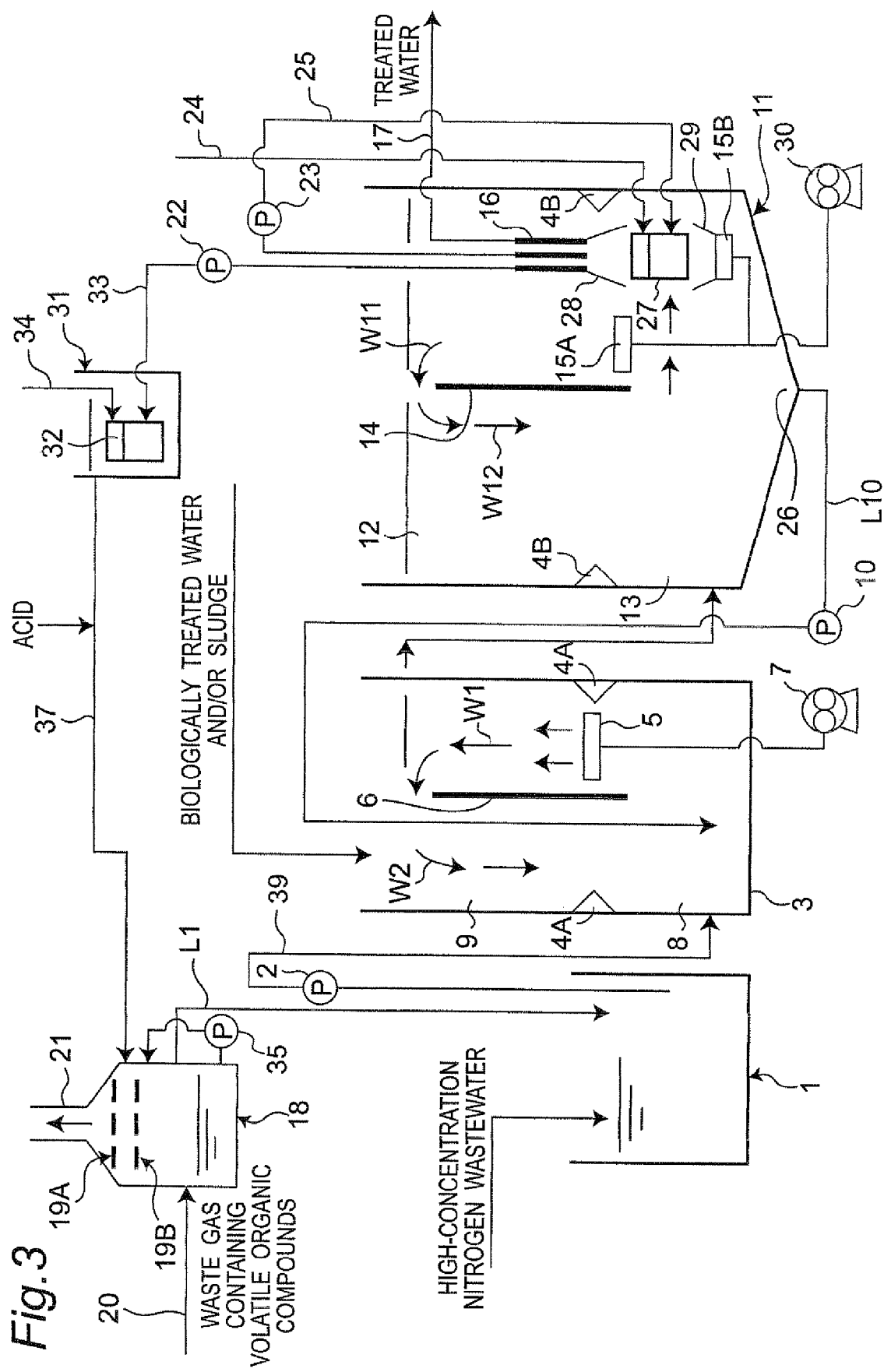
FIG. 3 shows a schematic view of an effluent treatment device in a third embodiment of the present invention.

Next, FIG. 3 shows waste gas/wastewater treatment equipment in a third embodiment of the present invention. The third embodiment is different from the aforementioned first embodiment only in the point that acid is added to the micronanobubble water flowing through the pipe 37 between the micronanobubble reaction vessel 31 and the scrubber 18.

In the third embodiment, acid is added to the micronanobubble water serving as scrubber washing water in the scrubber 18, so that the waste gas treatment capability in the scrubber 18 can be enhanced. Examples of the acid to be added include sulfuric acid.

Fourth Embodiment

Figure 4:
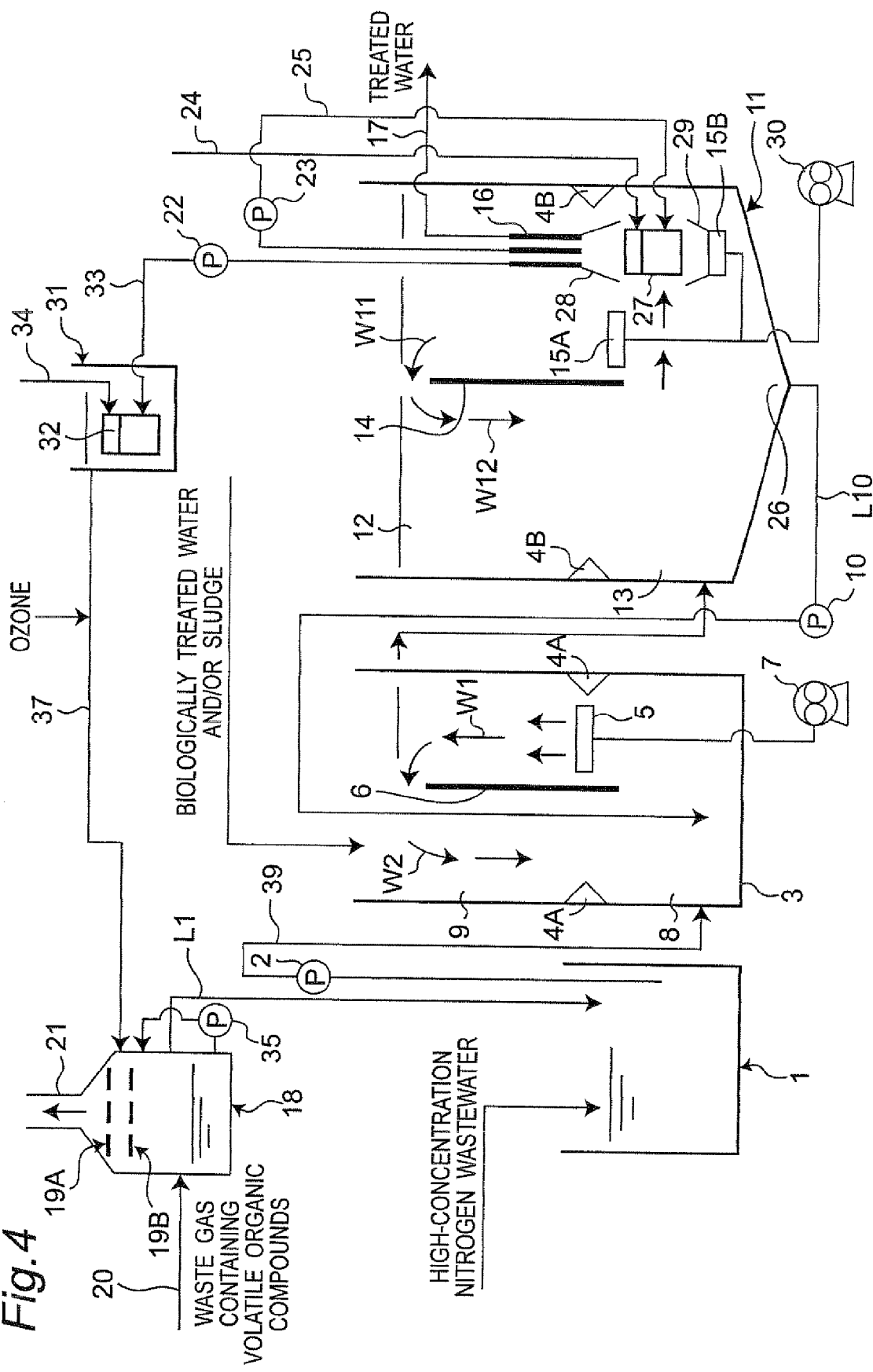
FIG. 4 shows a schematic view of an effluent treatment device in a fourth embodiment of the present invention.

Next, FIG. 4 shows waste gas/wastewater treatment equipment in a fourth embodiment of the present invention. The fourth embodiment is different from the aforementioned first embodiment only in the point that ozone water is added to the micronanobubble water flowing through the pipe 37 between the micronanobubble reaction vessel 31 and the scrubber 18.

In the fourth embodiment, ozone water is added to the micronanobubble water serving as scrubber washing water in the scrubber 18, so that the waste gas treatment capability in the scrubber 18 can be enhanced.

Fifth Embodiment

Figure 5:
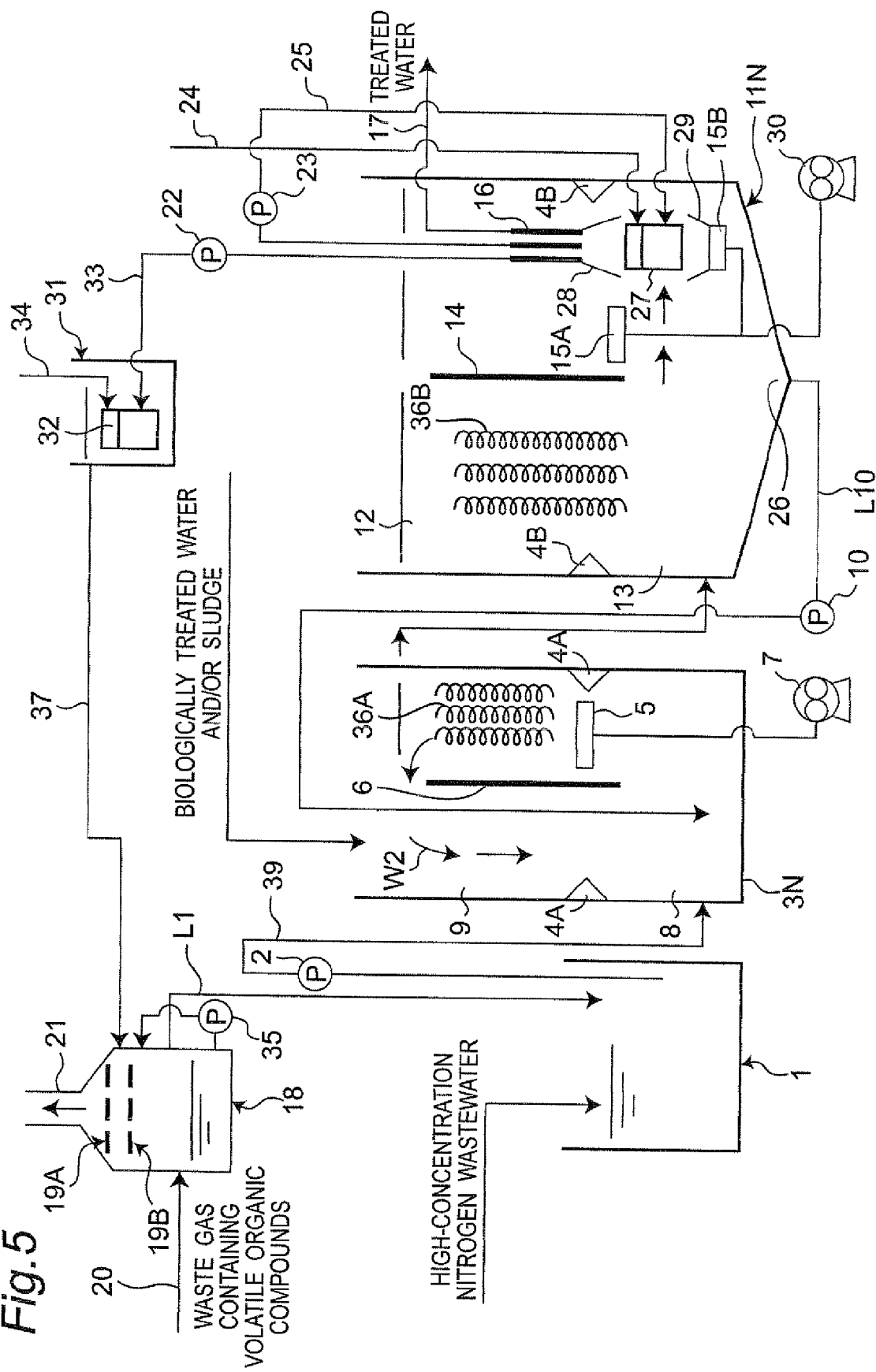
FIG. 5 shows a schematic view of wastewater treatment equipment in a fifth embodiment of the present invention.

Next, FIG. 5 shows waste gas/wastewater treatment equipment in a fifth embodiment of the present invention. In the fifth embodiment, a denitrification tank 3N and a nitrification tank 11N are filled with polyvinylidene chloride fillings 36A, 36B, while in the first embodiment the denitrification tank 3 and the nitrification tank 11 are not filled with fillings as shown in FIG. 1. Accordingly, in the fifth embodiment, the component parts identical to those in the first embodiment are denoted by identical reference numeral, and description will be omitted except the component parts different from the first embodiment.

In the fifth embodiment, the denitrification tank 3N and the nitrification tank 11N are filled with the polyvinylidene chloride fillings 36A, 36B in order to increase the nitrogen treatment efficiency for high-concentration nitrogen wastewater. With the presence of the polyvinylidene chloride fillings 36A, 36B, each of the tanks 3N and 11N has higher microbial concentration on average than the aerating tank having no filling. In addition, microorganisms attach to the polyvinylidene chloride fillings 36A, 36B and proliferate thereon, so that the microorganisms are more stabilized in comparison with the tank having no filling. In the fifth embodiment, the capability to treat nitrogen in high-concentration nitrogen wastewater is more enhanced.

It would be preferable that the polyvinylidene chloride fillings 36A and 36B are entirely placed in the tanks 3N and 11N, respectively, because this makes the overall microbial concentrations high in the entire tanks. Microorganisms proliferate on the polyvinylidene chloride fillings 36A, 36B as time proceeds from a test run of the waste gas/wastewater treatment equipment. The microbial concentration on the surface of the polyvinylidene chloride fillings 36A, 36B becomes 30,000 ppm or more, which contributes to increase in treatment efficiency of nitrogen. The polyvinylidene chloride fillings 36A, 36B are made of vinylidene chloride which is solid and resistant to chemical substances, so that the polyvinylidene chloride fillings 36A, 36B can be semipermanently used. Products such as Biocode, Ling-Lace, BioMultiLeaf and BIOmodule are available for the polyvinylidene chloride fillings 36A, 36B. Selection from among them may be made depending on the properties of wastewater. It is to be noted that in the aerobic section 12 of the nitrification tank 11N, ammonia nitrogen in treatment water is oxidized and dissolved into nitrate nitrogen and nitrite nitrogen by using aerobic microorganisms.

In the above embodiment, description has been given of the case, as a specific example, where waste gas containing volatile organic compounds is waste gas containing aminoethanol used in manufacturing equipment. However, the waste gas containing volatile organic compounds includes waste gas containing isopropyl alcohol, waste gas containing acetone and waste gas containing butyl acetate in addition to the waste gas containing aminoethanol. It should naturally be understood that any substance called volatile organic compounds (VOC) is fallen into the volatile organic compounds contained in the waste gas.

Experimental Example

We made experimental equipment having a configuration identical to that shown in FIG. 1 in the first embodiment. In the experimental equipment, the adjustment tank 1 had a capacity of 50 liters, the denitrification tank 3 had a capacity of 100 liters, the nitrification tank 11 had a capacity of 200 liters, and the micronanobubble reaction vessel 31 had a capacity of 20 liters. Microorganisms were cultured for about two months in the experimental equipment to have a microbial concentration of 18,000 ppm. Thereafter, high-concentration nitrogen wastewater having a nitrogen concentration of 3,340 ppm, which wastewater was discharged from manufacturing equipment in a plant, was continuously introduced into the adjustment tank 1 together with wastewater containing aminoethanol. After one month elapsed to stabilize the water quality, the nitrogen concentration was measured at the outlet of the gravity pipe 17, and the measurement result was 18 ppm.

FIG. 6A shows an example of a timing chart of retaining time of treatment water in each tank in the first to fifth embodiments in the case where high-concentration nitrogen wastewater has a nitrogen concentration of 2,000 ppm. FIG. 6B shows an example of a timing chart of retaining time of treatment water in each tank in the first to fifth embodiments in the case where high-concentration nitrogen wastewater has a nitrogen concentration of 4,000 ppm.

The invention claimed is:

1. A method of treating waste gas and waste water, comprising the steps of:
    contacting membrane-treated water which contains micronanobubbles with said waste gas to produce treated gas and treatment washing water, and
    contacting said treatment washing water with said waste water to produce micronanobubble containing waste water.

2. The method of treating waste gas and waste water according to claim 1, wherein
    the waste gas contains volatile organic compounds.

3. Waste gas/wastewater treatment equipment, comprising:
    a micronanobubble water production section constructed and arranged to produce membrane-treated water which contains micronanobubbles;
    a waste gas treatment section constructed and arranged to contact said membrane-treated water with waste gas to produce treated gas and treatment washing water; and
    a wastewater treatment section constructed and arranged to contact said treatment washing water with waste water to produce micronanobubble containing waste water.

4. The waste gas/wastewater treatment equipment according to claim 3, wherein
    the wastewater treatment section has a membrane which is constructed and arranged to be submerged in operation, and
    the micronanobubble water production section is constructed and arranged to produce the membrane-treated water in operation the submerged membrane.

5. The waste gas/wastewater treatment equipment according to claim 4, wherein
    the wastewater treatment section has an adjustment tank, a denitrification tank, and a nitrification tank and said nitrification tank includes said membrane,
    the micronanobubble water production section is a micronanobubble reaction vessel including a micronanobubble generator, and
    the waste gas treatment section is a water scrubber.

6. The waste gas/wastewater treatment equipment according to claim 5, wherein
    said adjustment tank is constructed and arranged to receive nitrogen-containing wastewater in operation, and
    said adjustment tank is constructed and arranged to receive said treatment washing water in operation.

7. The waste gas/wastewater treatment equipment according to claim 5, wherein
    the nitrification tank has a micronanobubble generator which is constructed and arranged to generate micronanobubbles for cleaning the submerged membrane in operation.

8. The waste gas/wastewater treatment equipment according to claim 7, wherein
    the nitrification tank has an air diffusing pipe which is constructed and arranged to discharge air for cleaning the submerged membrane in operation.

9. The waste gas/wastewater treatment equipment according to claim 3, wherein
    the waste gas treatment section is constructed and arranged to receive waste gas containing nitrogen compounds in operation.

10. The waste gas/wastewater treatment equipment according to claim 9, wherein nitrogen compound is aminoethanol.

11. The waste gas/wastewater treatment equipment according to claim 3, wherein
    the waste gas treatment section comprises:
    an upper section which is constructed and arranged to spray said membrane-treated water which contain micronanobubble as washing water in operation;
    a lower section which is constructed and arranged for receiving the sprayed washing water in operation; and
    a circulation section which is constructed and arranged for circulating the washing water from the lower section to the upper section in operation.

12. The waste gas/wastewater treatment equipment according to claim 3, wherein
    the waste gas treatment section is constructed and arranged to receive waste gas containing volatile organic compounds in operation.

* * * * *